United States Patent Office 3,466,246
Patented Sept. 9, 1969

---

3,466,246
INSECTICIDAL WASHING COMPOSITION
Ulrich J. Fregeau, 5464 Carr,
Denver, Colo. 80612
No Drawing. Continuation of application Ser. No.
441,833, Mar. 22, 1965. This application June 26,
1968, Ser. No. 744,612
Int. Cl. C11d 3/48, 3/065
U.S. Cl. 252—106                                      6 Claims

ABSTRACT OF THE DISCLOSURE

An insect repelling cleansing composition comprising a mixture of from about 50%–55% borax, about 35%–40% trisodium phosphate, 2%–10% soda ash, 2%–10% sodium sulfate and 2%–10% sodium dodecylbenzene sulfonate.

---

This application is a continuation of application Ser. No. 441,833, filed Mar. 22, 1965, now abandoned.

This application contains subject matter in common with and forms a continuation-in-part of my application Ser. No. 125,961, filed July 24, 1961, now abandoned, which contains subject matter in common with and forms a continuation-in-part of my application Ser. No. 745,280 filed June 30, 1958, now abandoned.

The maintaining of sanitary conditions in areas where foodstuffs are prepared and served has become increasingly important. In the past, it has been necessary to perform the cleaning operation with ordinary soaps, detergents and the like, which cleaning operation is followed by a separate treatment for the purpose of repelling or eliminating the insect population. For this second operation, the repellent must be of a type suitable to substantially completely repel or obviate insects, but still be nontoxic to humans.

A composition has now been found within the broad teaching of my prior applications, which when incorporated in an aqueous solution within a specified range of concentration acts as a cleansing agent and at the same time repels or obviates insects. The composition when used according to the instant teaching provides a convenient and efficient single step sanitation agent which is nontoxic to humans.

It is, therefore, a principal object of the present invention to provide a novel composition and aqueous solution thereof which is useful as a cleansing agent, serves to repel or obviate insects and is nontoxic to humans.

It is a further object of the invention to provide an improved cleansing composition suitable for use in areas where food is prepared and served for human consumption and further acts as an effective insect repellent or obviating agent for an extended period of time following the cleansing operation.

A further important object of the present invention is to provide an improved composition which is useful as a cleansing and insect repellent or obviating agent, is inexpensive to manufacture and is highly effective for the intended purpose.

A still further object of the present invention is to provide an improved composition and a method of using same in aqueous solution for cleansing and insect repelling or obviating in areas where foodstuffs are stored, prepared and served for human consumption.

In my earlier field applications it was disclosed that a cleansing composition having substantial insect repellent or obviating properties could be formed by mixing together an amount of trisodium phosphate with an amount of borax (sodium tetraborate) in the range of from about 25 to about 75% trisodium phosphate and from about 25 to about 75% of borax. It has now been found that a preferred range for the composition of this invention based upon percent by weight on a dry basis consists of from 40 to 55% borax, 35 to 50% trisodium phosphate and the balance selected from a group of additives consisting of soda ash, sodium sulphate and a synthetic detergent such as an alkali metal alkylaryl sulfonate, such as the sodium sulfonate of dodecylbenzene, and mixtures thereof in the range of from 2% to 10% each.

It will be understood that the proportions may be varied within the preferred range particularly where supplemental surface modifying agents such as detergents or wetting agents are employed.

An aqueous solution of about 7 to about 9 ounces of this composition per gallon of water provides a cleansing solution which is also an effective insect repellent. The preferred composition when dissolved in water in the indicated amounts and applied to a surface in a normal cleaning operation as by scrubbing and the like provides an effective cleaning power and insect repelling action. When used in a percentage composition wherein the borax is below the preferred range and concentration, the cleaning power suffers and the insect repelling action is lost for all practical purposes. When concentrations and the preferred percentage compositions are exceeded, an unsightly film is left behind eliminating any cleaning advantages.

After a floor, for example, in a restaurant has been scrubbed with an aqueous solution of the preferred composition of the instant invention in the disclosed composition, insects, such as cockroaches, ants and the like disappear and do not reappear for a period of several weeks without rescrubbing. Of course, a restaurant floor is usually scrubbed several times a week and when scrubbed with the aqueous solution of the present invention, insects cease to exist. Most insects are destroyed while a few merely vacate. The solution of the present invention while extremely effective against insects presents no problem to humans as it is nontoxic when used in the manner and proportions disclosed.

While it is not completely understood why the preferred composition in the preferred concentration has improved cleansing and insect repelling properties over the component parts alone, it is believed that a synergistic effect is present in the combination of the ingredients which are most pronounced when present within the preferred ranges.

For a better understanding to those skilled in the art, the following are representative examples of an insect repellent cleansing composition in accordance with the present invention:

(1)

|  | Parts |
|---|---|
| Trisodium phosphate | 40 |
| Borax | 50 |
| Soda ash | 3.3 |
| Sodium sulfate | 3.3 |
| Alkylaryl sulfonate | 3.3 |

(2)

| Trisodium phosphate | 35 |
|---|---|
| Borax | 55 |
| Soda ash | 3.3 |
| Sodium sulfate | 3.3 |
| Alkylaryl sulfonate | 3.3 |

(3)

| Trisodium phosphate | 50 |
|---|---|
| Borax | 40 |
| Soda ash | 3.3 |
| Sodium sulfate | 3.3 |
| Alklaryl sulfonate | 3.3 |

It will be appreciated that the examples set forth above are to be construed in an illustrative manner and not by way of limitation. Formulae of varying composition may be employed within the range of compositions disclosed together with additives as indicated.

In a controlled laboratory test by an independent laboratory a solution of the composition of this invention as set forth in Example 1 above at a concentration of 0.5 pound per gallon of water was applied to a piece of linoleum and provided a residual dosage of 120 mg./sq. ft. of the composition on the linoleum. This was only a single application of the composition and test insects, which were adult male German cockroaches, were confined for a week in a 30 x 30 inch square pen having an open bottom set on the treated linoleum. This test resulted in a percentage kill on the order of about 70%. It was reported that a larger kill may have been had if it were not for an excessive amount of mineral oil used on the glass slides used to confine the insects in the pen. Also where the application of the solution is repeated periodically, a greater kill can be expected. Of couse, it is not necessary to achieve a 100% kill for the composition of this invention to be effective since the use of the composition in commercial establishments and at military installations has resulted in the complete elimination of cockroaches and other crawling insects from the premises and the exact percentage which were killed and those that were merely driven off is not known. The important results is that the insects were virtually eliminated by the scrubbing of the floors and crawl areas with the recommended concentration of the compound of this invention in water, while the residual is nontoxic to humans as would be the case with normally used insecticides.

While there have been described what at present are considered to be the preferred embodiments of the invention, it will be obvious to those skilled in the art that various modifications may be made therein without departing from the invention. It is aimed, therefore, in the appended claims to cover all such changes and modifications which fell within the true spirit and scope of the invention.

What is claimed is:

1. An insect repelling cleansing composition consisting of from about 7 to about 9 ounces of a mixture of from about 50% to about 55% borax, from about 35% to about 40% trisodium phosphate, 2% to 10% soda ash, 2% to 10% sodium sulfate and 2% to 10% of an alkali metal dodecylbenzene sulfonate per gallon of water.

2. An insect repelling cleansing composition consisting of from about 50% to 55% borax, from about 35% to about 40% trisodium phosphate, 2% to 10% soda ash, 2% to 10% sodium sulfate and 2% to 10% of an alkali metal dodecylbenzene sulfonate.

3. An insect repelling cleansing composition consisting of from about 7 to about 9 ounces of a mixture of from about 50% to 55% borax, from about 35% to about 40% trisodium phosphate, 2% to 10% soda ash, 2% to 10% sodium sulfate and 2% to 10% of an alkali metal dodecylbenzene sulfonate per gallon of water wherein the ingredients are present in substantially the following proportions on a dry basis:

|  | Percent |
|---|---|
| Trisodium phosphate | 40 |
| Borax | 50 |
| Soda ash | 3.3 |
| Sodium sulfate | 3.3 |
| Sodium dodecylbenzene sulfonate | 3.3 |

4. An insect repelling cleansing composition consisting of from about 7 to about 9 ounces of a mixture of from about 50% to about 55% borax, from about 35% to about 40% trisodium phosphate, 2% to 10% soda ash, 2% to 10% sodium sulfate and 2% to 10% of an alkali metal dodecylbenzene sulfonate per gallon of water wherein the ingredients are present in substantially the following proportions on a dry basis:

|  | Percent |
|---|---|
| Trisodium phosphate | 35 |
| Borax | 55 |
| Soda ash | 3.3 |
| Sodium sulfate | 3.3 |
| Sodium dodecylbenzene sulfonate | 3.3 |

5. An insect repelling cleansing composition consisting of from about 50% to 55% borax, from about 35% to about 40% trisodium phosphate, 2% to 10% soda ash, 2% to 10% sodium sulfate and 2% to 10% of an alkali metal dodecylbenzene sulfonate wherein the ingredients are present in substantially the following proportions on a dry basis:

|  | Percent |
|---|---|
| Trisodium phosphate | 40 |
| Borax | 50 |
| Soda ash | 3.3 |
| Sodium sulfate | 3.3 |
| Sodium dodecylbenzene sulfonate | 3.3 |

6. An insect repelling cleansing composition consisting of from about 50% to 55% borax, from about 35% to about 40% trisodium phosphate, 2% to 10% soda ash, 2% to 10% sodium sulfate and 2% to 10% of an alkali metal dodecylbenzene sulfonate wherein the ingredients are present in substantially the following proportions on a dry basis:

|  | Percent |
|---|---|
| Trisodium phosphate | 35 |
| Borax | 55 |
| Soda ash | 3.3 |
| Sodium sulfate | 3.3 |
| Sodium dodecylbenzene sulfonate | 3.3 |

References Cited

UNITED STATES PATENTS 879,902  2/1908  Prusz _____ 252—139

FOREIGN PATENTS 848,306  9/1960  Great Britain.

LEON D. ROSDOL, Primary Examiner

P. E. WILLIS, Assistant Examiner

U.S. Cl. X.R.

252—138